United States Patent [19]
Chiu

[11] Patent Number: 6,163,451
[45] Date of Patent: Dec. 19, 2000

[54] DISPLAY BASE

[75] Inventor: Hsin-Liang Chiu, Miau-Lih Hsien, Taiwan

[73] Assignee: Senor Science Co., Ltd., Taipei, Taiwan

[21] Appl. No.: 09/295,343

[22] Filed: Apr. 21, 1999

[30] Foreign Application Priority Data

Oct. 28, 1998 [TW] Taiwan .................................. 87217773

[51] Int. Cl.$^7$ ........................................................ H05K 5/00
[52] U.S. Cl. ........................... 361/681; 361/682; 361/741; 248/419
[58] Field of Search ..................................... 361/679, 683, 361/681, 682, 741

[56] References Cited

U.S. PATENT DOCUMENTS

| | | | |
|---|---|---|---|
| 4,621,782 | 11/1986 | Carlson et al. | 248/183 |
| 4,905,543 | 3/1990 | Choi | 74/827 |
| 5,124,805 | 6/1992 | Chung et al. | 358/248 |
| 5,683,068 | 11/1997 | Chase et al. | 248/371 |
| 5,715,137 | 2/1998 | Choi | 361/681 |
| 5,771,152 | 6/1998 | Crompton et al. | 361/681 |
| 6,007,038 | 12/1999 | Han | 248/371 |
| 6,050,641 | 4/2000 | Benson | 297/284.4 |

FOREIGN PATENT DOCUMENTS

| | | |
|---|---|---|
| 301439 | 3/1997 | Taiwan . |
| 322168 | 12/1997 | Taiwan . |
| 322245 | 12/1997 | Taiwan . |
| 325174 | 1/1998 | Taiwan . |
| 327986 | 3/1998 | Taiwan . |
| 336775 | 7/1998 | Taiwan . |

*Primary Examiner*—Leo P. Picard
*Assistant Examiner*—Cynthia A. Fredrickson
*Attorney, Agent, or Firm*—Dykema Gossett PLLC

[57] ABSTRACT

The present invention relates to a display base which can adjust the angle of the display, especially the angle of a touch screen liquid crystal display of a cash register. The display base mainly comprises an upper body, a lower body and moving apparatus. The upper body is used for mounting a display screen; one side of the upper body is of an arcuate shape. The lower body is used for mounting a calculator device; one side of the lower body is also of an arcuate shape for being connected with the upper body. The moving apparatus is mounted in the upper body, and comprises a motor which can rotate to drive a worm, a worm wheel and a gear engaged with a tooth hole provided on the lower body in order to move the upper body upward and downward to achieve the function of angle adjustment, and the angle displacement of the screen caused by the pressing of the screen will not occur.

3 Claims, 6 Drawing Sheets

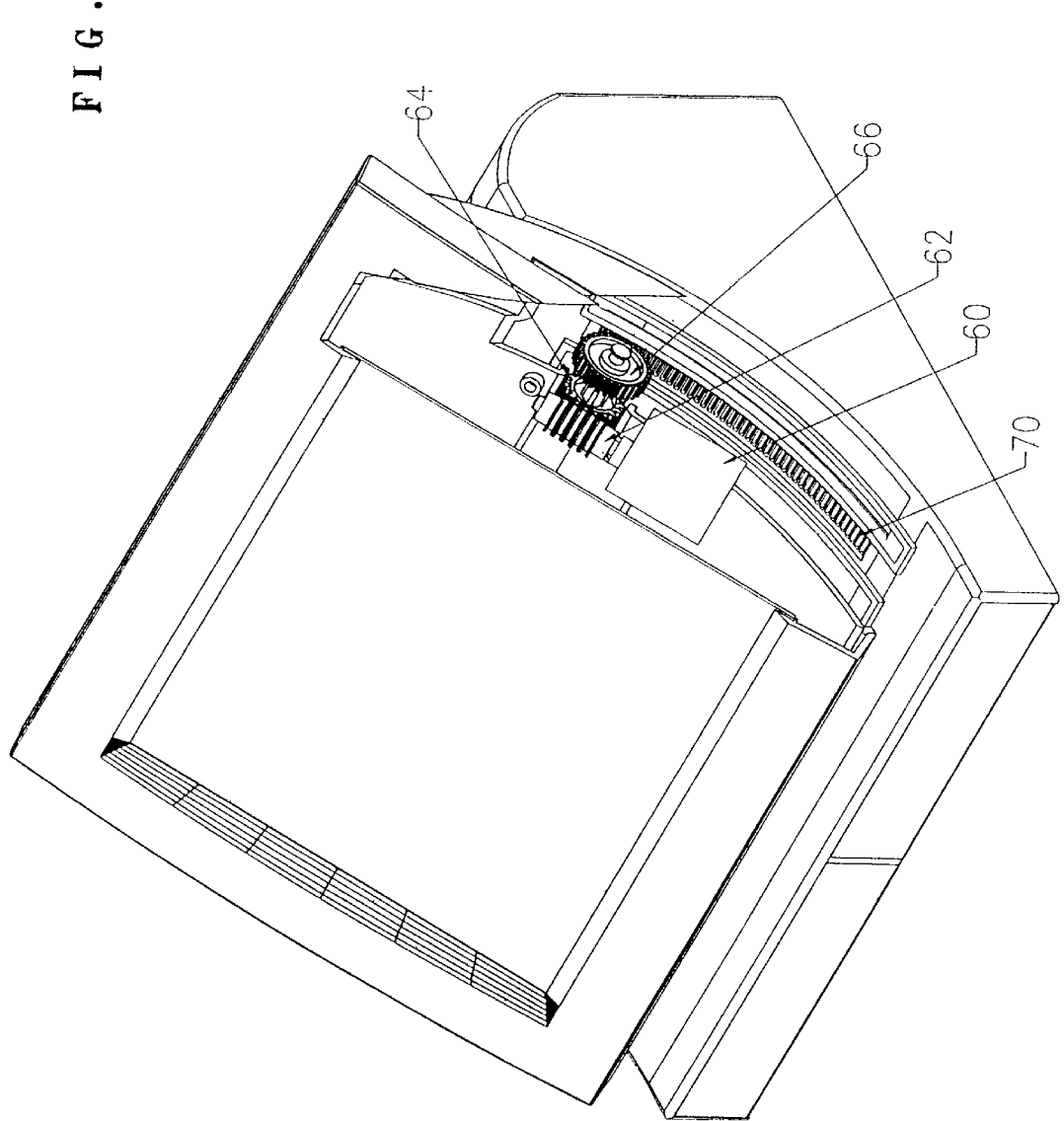

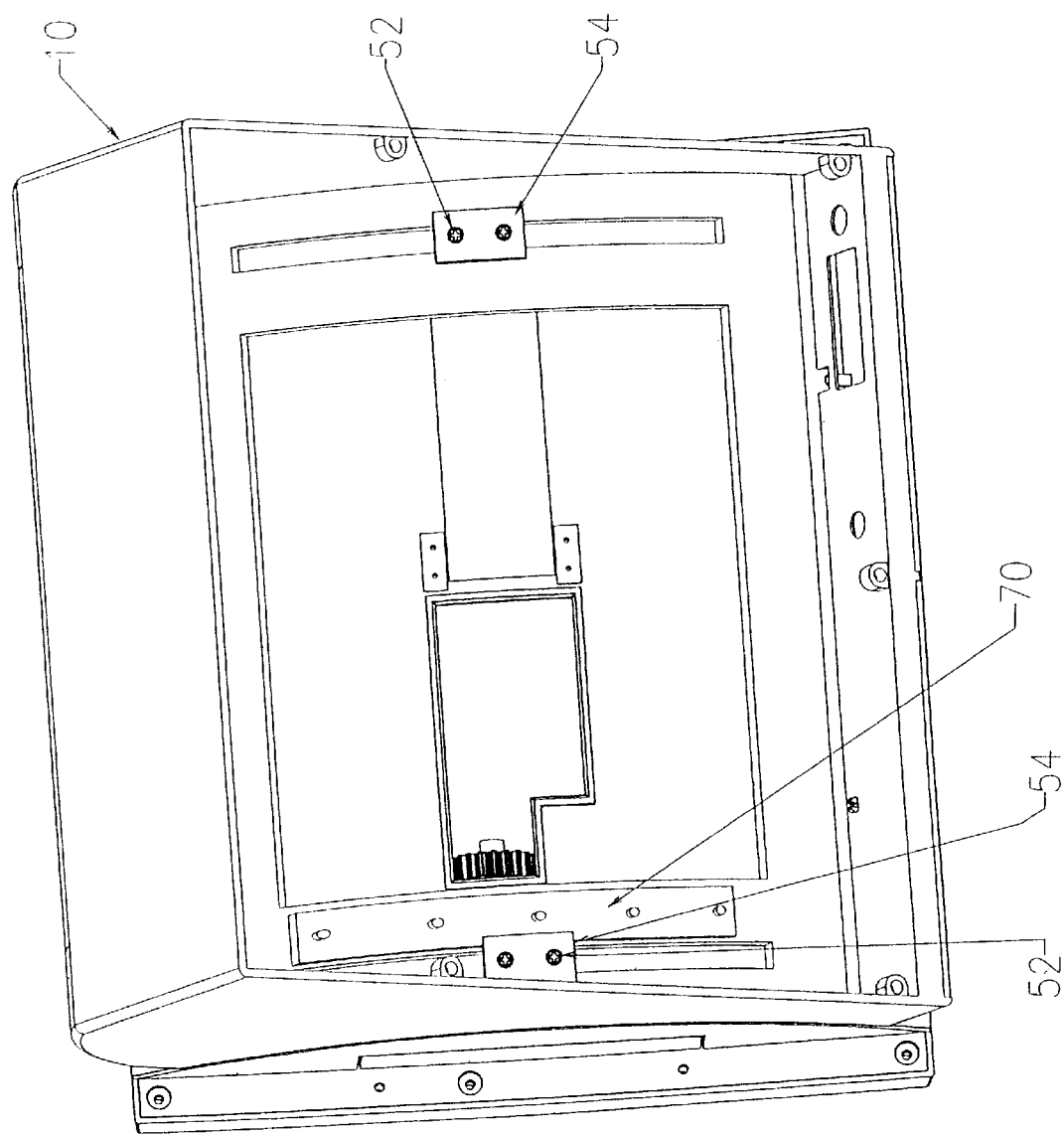

DISPLAY BASE

FIELD OF THE INVENTION

The present invention relates to a display base, for example, a base for a touch screen display or planar display, and more particularly, to a base for a touch screen liquid crystal display.

DESCRIPTION OF THE PRIOR ART

Most of the calculator devices, such as a computer or cash register, are equipped with display devices so that the users can read various information conveniently. However, due to the different height and the different standing or seating posture of the users, and due to the visual angle or light reflection, it is necessary to provide an angle adjustment device for the display or display device to meet various needs.

The angle adjustment device for conventional CRT (cathode-ray tube) display is well know, such as Taiwanese Patent Gazette Publication No. 327986 entitled "Safety structure for rotatable base of display". The angle adjustment device for LCD (liquid crystal display) is also well know, such as Taiwanese Patent Gazette Publication No. 322168 entitled "Improved structure of base for liquid crystal display", Taiwanese Patent Gazette Publication No. 336775 entitled "Base for liquid crystal display", and Taiwanese Patent Gazette Publication No. 322245 entitled "Improved structure of base for cooperating with a liquid crystal display". The angle adjustment device for cash register is also well know, such as Taiwanese Patent Gazette Publication No. 325174 "Simple fixing structure for cash register display", and Taiwanese Patent Gazette Publication No. 301439 entitled "Movable base for cash register display".

However, the aforesaid conventional devices are not only complex in structure, but also difficult in mounting and manufacturing, and are not suitable for a display with a touch screen. Because the touch screen of the display is usually touched by hands or other objects, the angle adjustment device will displace after pressing on the screen, and thus it needs to be adjusted again in order to return to its original visual angle. Such problems will become more serious for a light weight liquid crystal display, because the displacement of the angle adjustment device will become larger when pressing a light weight liquid crystal display and thus cause more inconvenience to the users.

Therefore, to develop a display base having an angle adjustment device for a touch screen display, especially for a cash register having a touch screen liquid crystal display is an important issue.

OBJECT OF THE INVENTION

It is therefore an object of the present invention to provide a display base having an angle adjustment device, which can be arbitrarily adjusted to an appropriate angle depending on the user's visual angle or light reflection.

It is another object of the present invention to provide a display base having an angle adjustment device, which is particularly suitable to cash registers having a touch screen liquid crystal display, and can maintain the angle of the display when the touch screen is pressed.

A further object of the present invention is to provide a display base having an angle adjustment device, which has a simple structure and is easy to be mounted and manufactured.

SUMMARY OF THE INVENTION

The display base of the present invention has a first display screen, preferably a touch screen liquid crystal display, and another side of the base is optionally provided with a second display screen. The display base mainly comprises an upper body, a lower body and moving means. The upper body is used for receiving the first display screen; one side of the upper body is of an arcuate shape and is provided with three recesses and a slot. The lower body is used for receiving a calculator device; one side of the lower body is also of an arcuate shape for being connected with the upper body, and is provided with three elongate holes each having a flange at the periphery thereof for being inserted into these three recesses of the upper body respectively, and a plurality of longitudinally arranged tooth holes for aligning with the slot of the upper body. The moving means is mounted in the upper body, and comprises a motor which can rotate to drive a worm, a worm wheel and a gear which slightly projects from the slot and is engaged with the tooth hole on the lower body to rotate upward and downward, whereby the upper body can be moved upward and downward respectively along the arcuate surface to achieve the function of angle adjustment, and the angle displacement of the screen caused by the pressing of the screen will not occur.

BRIEF DESCRIPTION OF THE DRAWINGS

These and other attributes of the present invention will become more clear upon a thorough study of the following description of the preferred embodiment for carrying out the invention, particularly when reviewed in conjunction with the drawings, wherein:

FIG. 5 is a perspective view showing the moving means of the display base in accordance with the present invention, wherein the display is at a slightly vertical position; and FIG. 6 is a bottom perspective view of the display base in accordance with the present invention.

DETAILED DESCRIPTION OF THE INVENTION

Please refer to FIGS. 1 to 6, which show an embodiment of the present invention.

Figure 1:
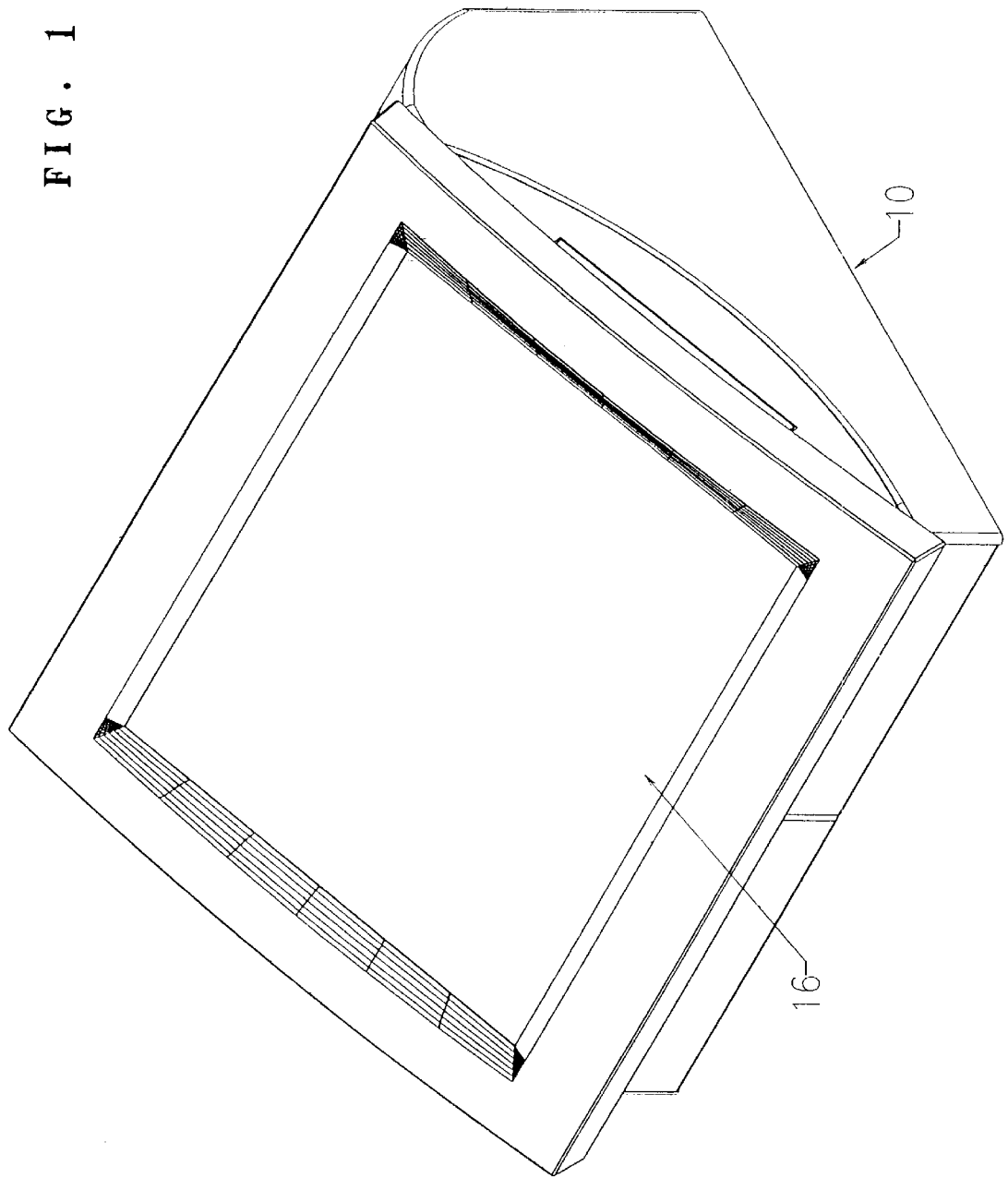
FIG. 1 is a perspective view of a display base in accordance with the present invention, wherein the display is at a slightly horizontal position.
Figure 2:
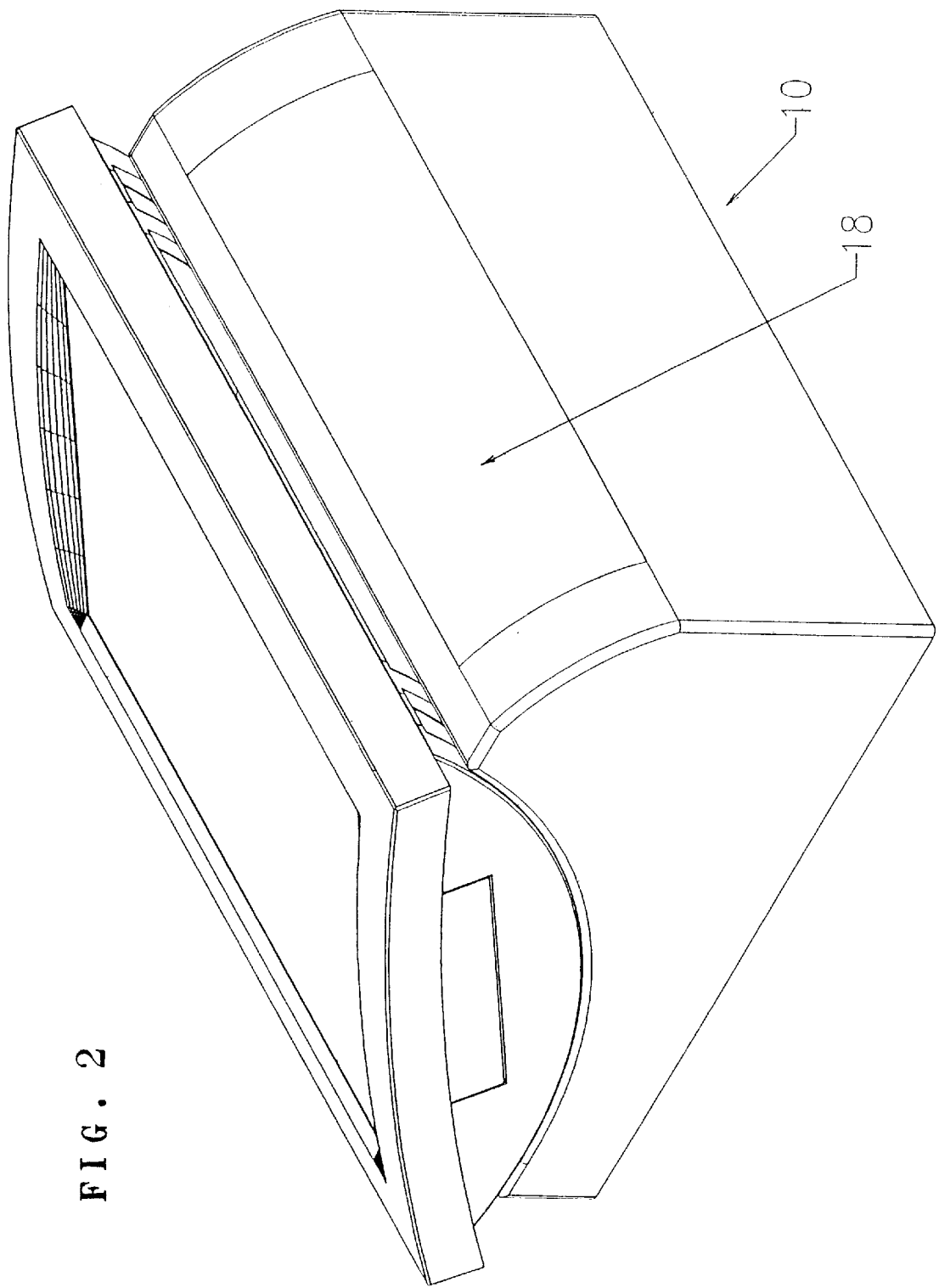
FIG. 2 is a perspective view of a display base in accordance with the present invention, wherein the display is at a slightly vertical position.

Please refer to FIGS. 1 and 2. The display base 10 of the present invention comprises a first display screen 16 of which the angle can be adjusted. In the following, the adjustment of the angle of the first display screen 16 along an arcuate surface will be explained in detail. FIG. 1 shows the display at a slightly horizontal position, and FIG. 2 shows the display at a slightly vertical position. The first display screen 16 is preferably a touch screen liquid crystal display. Another side of the display base 10 can be optionally provided with a second display screen 18 to show some brief information, for example, the total amount of each transaction.

Figure 3:
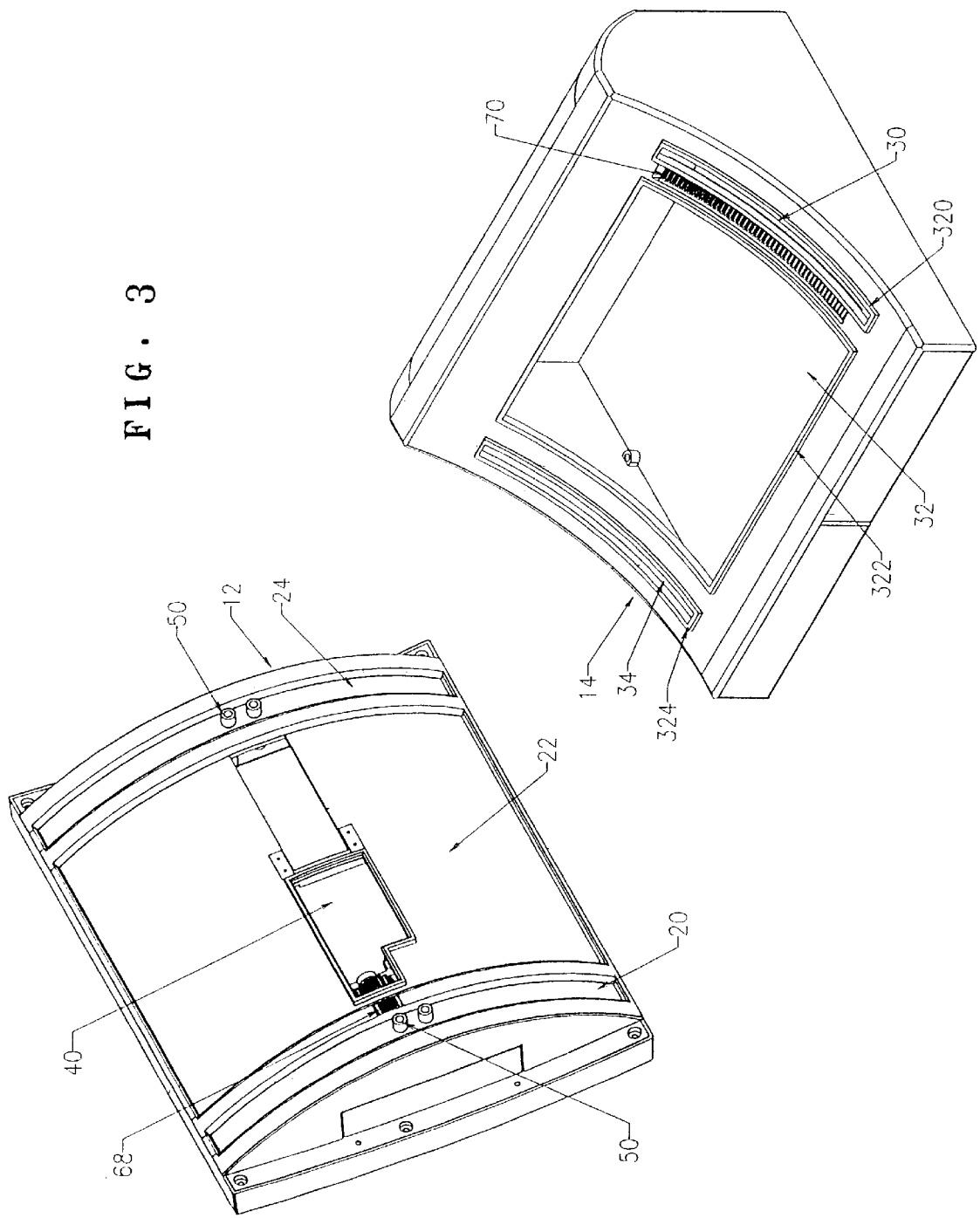
FIG. 3 is an exploded perspective view of the display base in accordance with the present invention, showing an upper body and a lower body.

Please refer to FIG. 3. The display base 10 of the present invention mainly comprises an upper body 12, a lower body 14 and moving means which will be explained in detail in the following paragraph. The upper body 12 is used for mounting a first display screen 16 and the moving means.

One side of the upper body 12 is of an arcuate shape and is provided with a first, second, and third recesses 20, 22, 24, and a slot 68; each of the first and third recesses 20, 24 is provided with a threaded hole seat 50, and the second recess 22 is provided with a square hole 40. The lower body 14 is used for mounting the mainframe of a computer or a cash register; one side of the body 14 is also of an arcuate shape for connecting with the arcuate shape of the upper body 12, and is provided with a first, second, and third elongate holes 30, 32, 34, and a plurality of longitudinally arranged tooth holes 70. The periphery of the first, second and third elongate holes 30, 32, 34 are provided with a first, second and third flanges 320, 322, 324, respectively, in order to be inserted into the first, second and third recesses 20, 22, 24 of the upper body 12 respectively such that the upper body 12 can move along an arcuate surface without offsetting. The square hole 40 of the second recess 22 can be received in the second elongate hole 32 so that the electric lines or cables of the first display screen 16 mounted in the upper body 12 can pass therethrough to be connected with the mainframe of the computer or cash register mounted in the lower body 14. The slot 68 aligns with each tooth hole 70, and the threaded hole seats 50 of the first and third recesses 20, 24 are received in the first and third elongate holes 30, 34 respectively.

Figure 4:
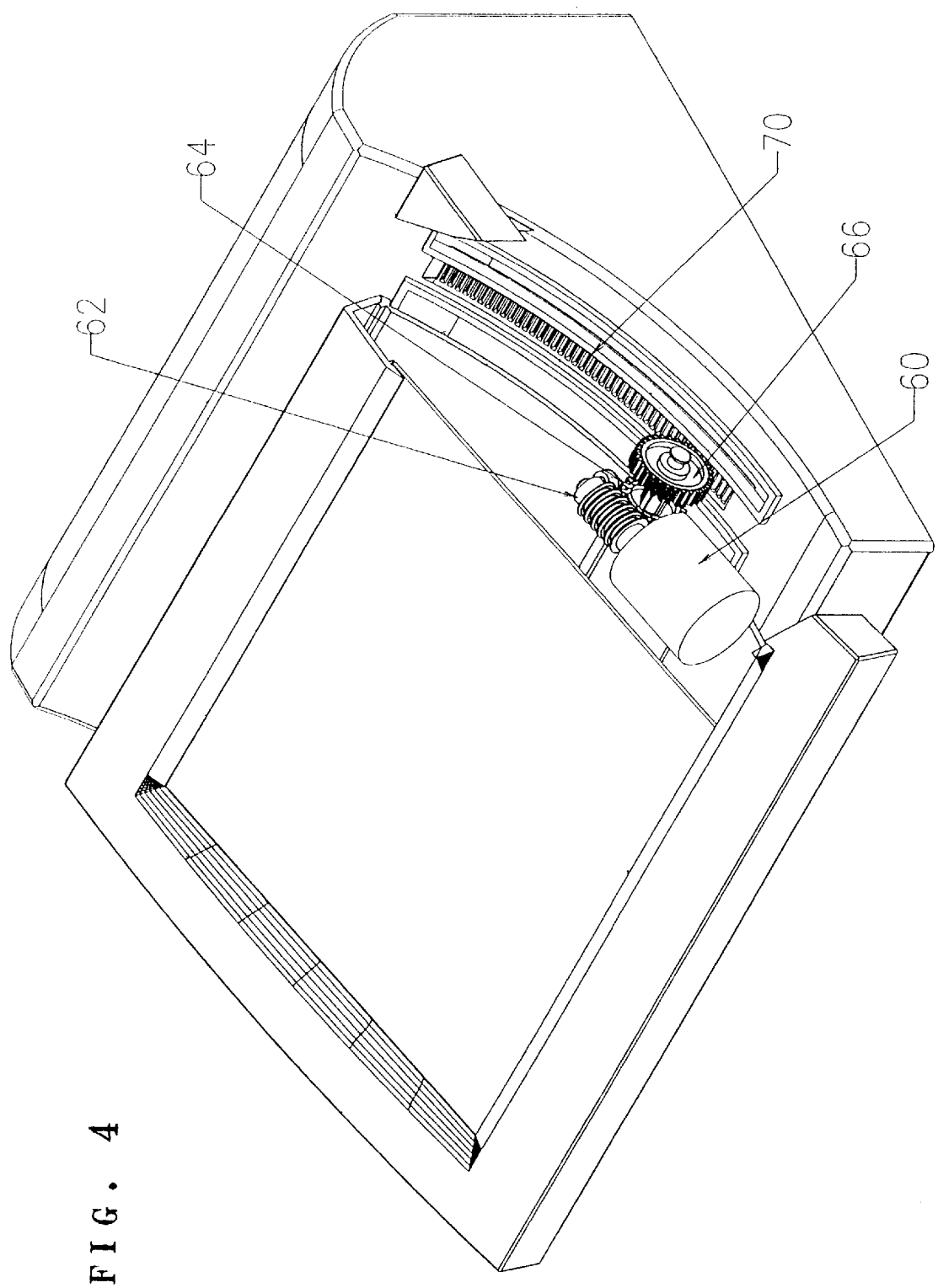
FIG. 4 is a perspective view showing the moving means of the display base in accordance with the present invention, wherein the display is at a slightly horizontal position.

Please refer to FIGS. 4 and 5. The moving means is mounted in the upper body 12, and comprises a motor 60, a worm 62, a worm wheel 64, and a gear 66. The mandrel of the motor 60 is connected with the worm 62, and the worm 62 is engaged with the worm wheel 64, and the worm wheel 64 is co-axially fixed with the gear 66. The gear 66 is near the slot 68 and slightly projects from the slot 68 so as to be engaged with the tooth hole 70 on the lower body 14. When the switch for the motor is turned on (the switch can be provided at an appropriate position, which is not shown in the drawing), the motor 60 is energized, the worm 62, worm wheel 64 and gear 66 will be driven, and according to the clockwise or counter clockwise rotation of the motor 60, the gear 66 engaged with the tooth hole 70 will move upward and downward, whereby the upper body 12 can be moved upward or downward respectively in order to adjust the angle of the screen; for example, FIG. 4 shows the display screen at a slightly horizontal condition, and FIG. 5 shows the display screen at a slightly vertical condition. Since the angle adjustment is controlled by the motor 60, even if the first display screen 16 is subjected to the pressing pressure, the angle of the screen can still be maintained.

Further, please refer to FIG. 6 which shows the bottom perspective view of the display base. For avoiding the upper and lower bodies separating from each other, two threaded hole seats 50, 50 provided on the upper body 12 are received in the first and third elongate holes 30, 34 of the lower body 14 respectively, and each of the threaded hole seats 50, 50 is fixed to fixing plate 54 by means of bolts 52.

Further, the display base 10 of the present invention can be provided with a plurality of receptacles (not shown in the drawings) if desired, in order to be connected with a disk driver, keyboard, magnetic card reader, invoice machine, bar code reader, etc. The display base 10 of the present invention can also be additionally provided with various types of supports or seats to change the standing manner or direction of the base. However, such changes are not the emphasized points of the present invention and are not described here in detail.

The present invention is not limited by the forgoing description of the embodiments, and the invention may be embodied in other specific forms without departing from the spirit or essential characteristic of the appended claims.

DESCRIPTION OF THE REFERENCE NUMERALS 10 display base
12 upper body
14 lower body
16 first display screen
18 second display screen
20 first recess
22 second recess
24 third recess
30 first elongate hole
32 second elongate hole
34 third elongate hole
40 square hole
50 threaded hole seat
52 bolt
54 fixing plate
60 motor
62 worm
64 worm wheel
66 gear
68 slot
70 teeth hole
320 first flange
322 second flange
324 third flange

What is claimed is:

1. A display base comprising an upper body, a lower body and moving means, wherein:
   one side of said upper body is of an arcuate shape and is provided with a first, second, and third recesses, and a slot; each of said first and third recesses is provided with a threaded hole seat, and said second recess is provided with a square hole;
   one side of said lower body is also of an arcuate shape for connecting with said arcuate shape of said upper body, and is provided with a first, second, and third elongate holes, and a plurality of longitudinally arranged tooth holes; the periphery of said first, second and third elongate holes are provided with a first, second and third flanges respectively, in order to be inserted into said first, second and third recesses respectively; said square hole of said second recess can be received in said second elongate hole; said slot aligns with each tooth hole, and the threaded hole seats of said first and third recesses are received in said first and third elongate holes respectively, and each of said threaded hole seats is fixed to a fixing plate in order to avoid said upper body and said lower body separating from each other;
   said moving means is mounted in said upper body, and comprises a motor, a worm, a worm wheel, and a gear; the mandrel of said motor is connected with said worm, and said worm is engaged with said worm wheel, and said worm wheel is co-axially fixed with said gear; said gear is near said slot and slightly projects from said slot so as to be engaged with said tooth hole such that when said motor is energized, said worm, worm wheel and gear will be driven, and according to the clockwise or counter clockwise rotation of said motor, said gear engaged with said tooth hole will move upward and downward, whereby said upper body can be moved upward or downward, respectively.

2. A display base as claimed in claim 1, wherein a first display screen is provided on another side of said upper body, and a calculator device such as a computer is mounted in said lower body.

3. A display base as claimed in claim 2, wherein another side of said lower body is provided with a second display screen.

* * * * *